June 25, 1935.  H. ERNST ET AL  2,006,311
LEAKAGE COMPENSATOR FOR HYDRAULIC SYSTEMS
Filed Sept. 9, 1931  6 Sheets-Sheet 3
_Fig. 9._
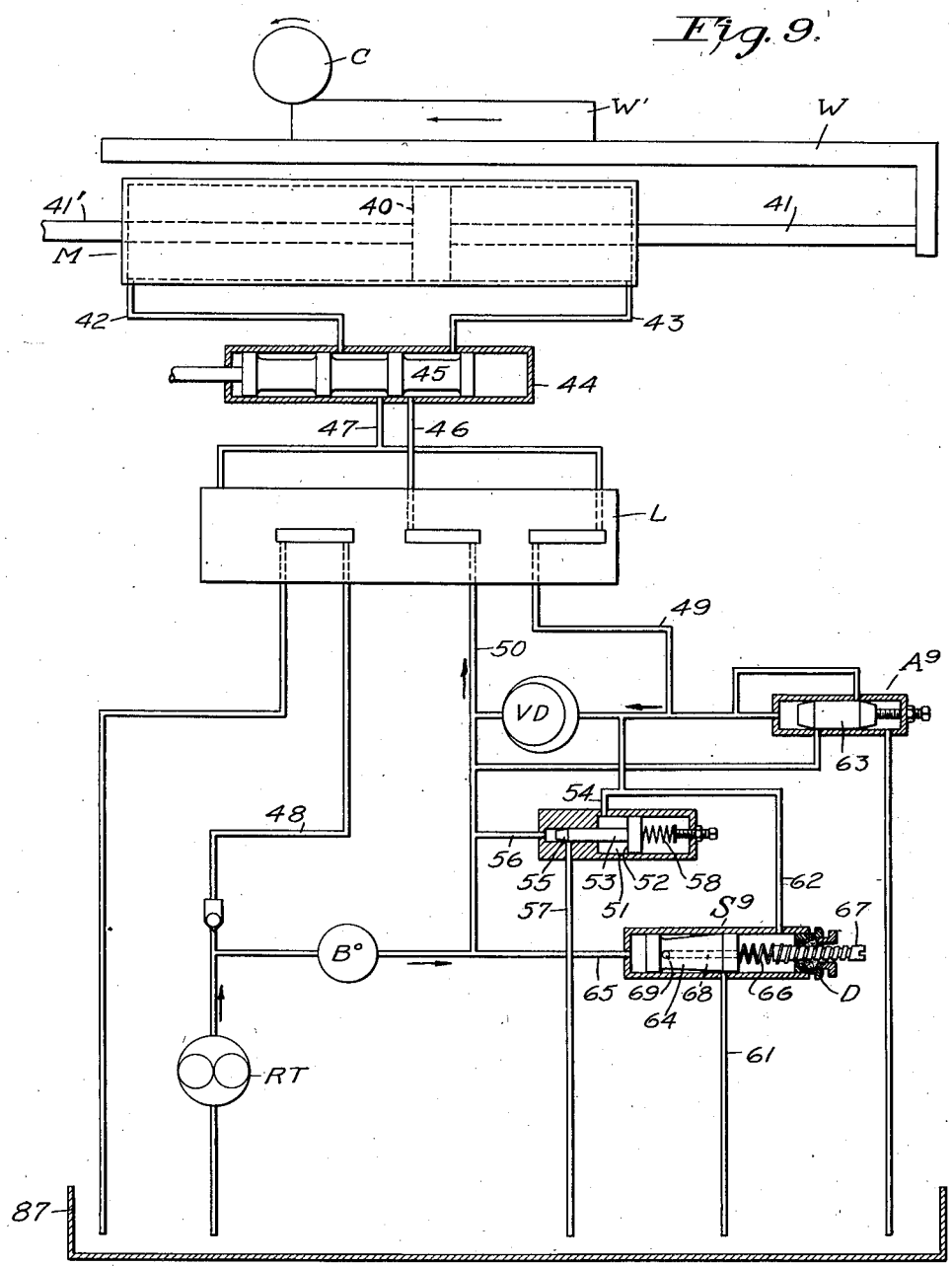
Inventors
Hans Ernst
Bernard Sassen
By Attorneys
Nathan Bowman & Helfrich

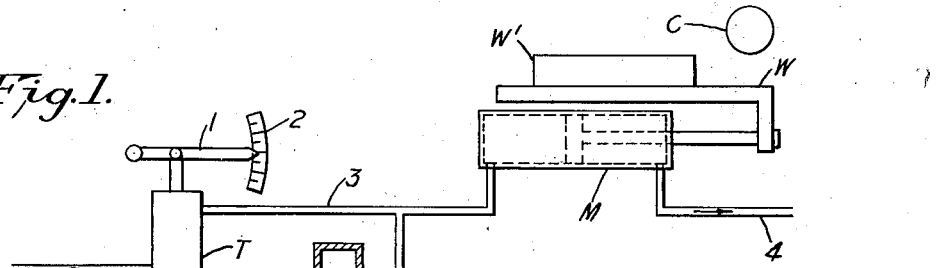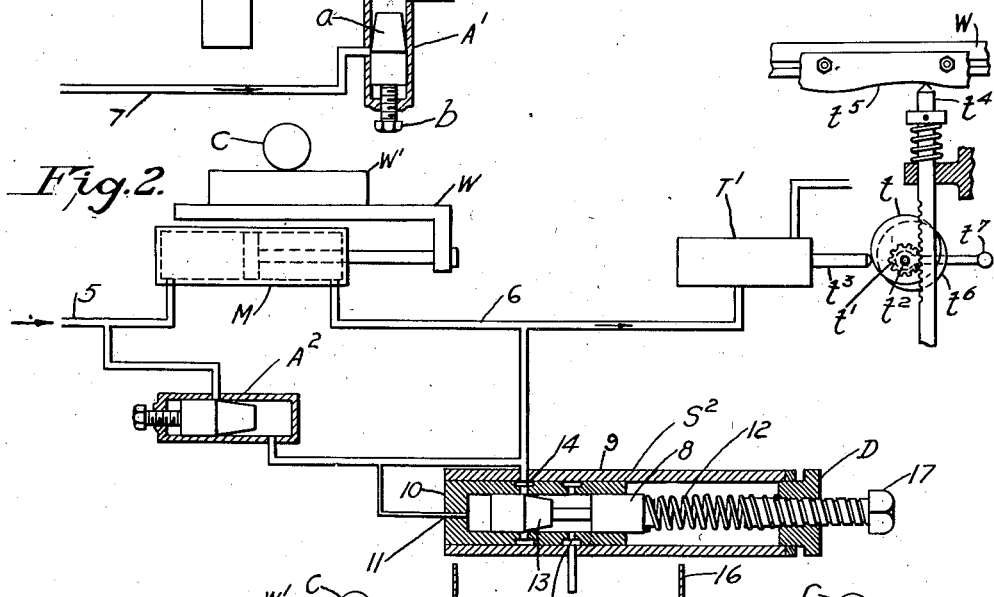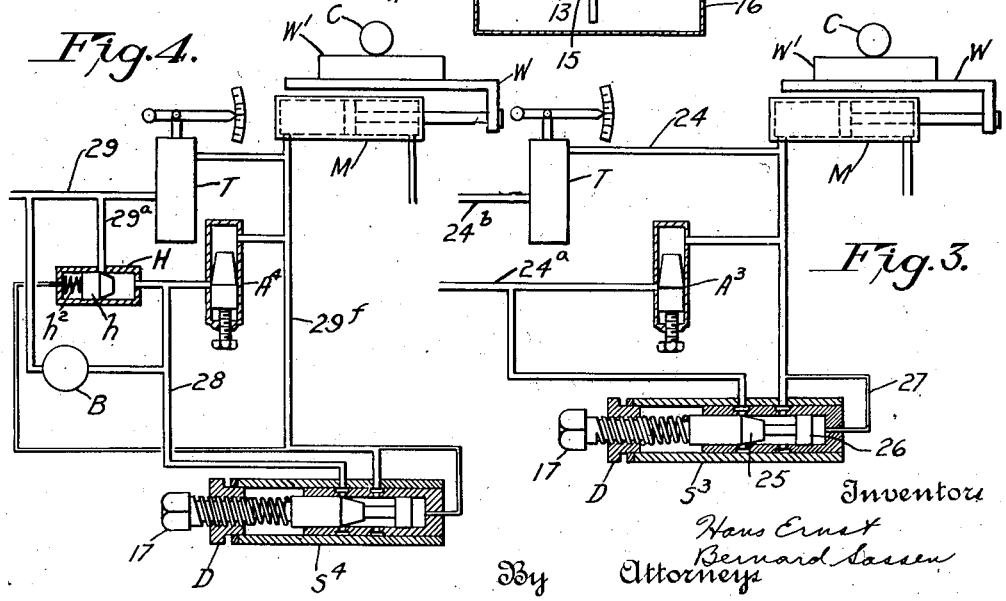

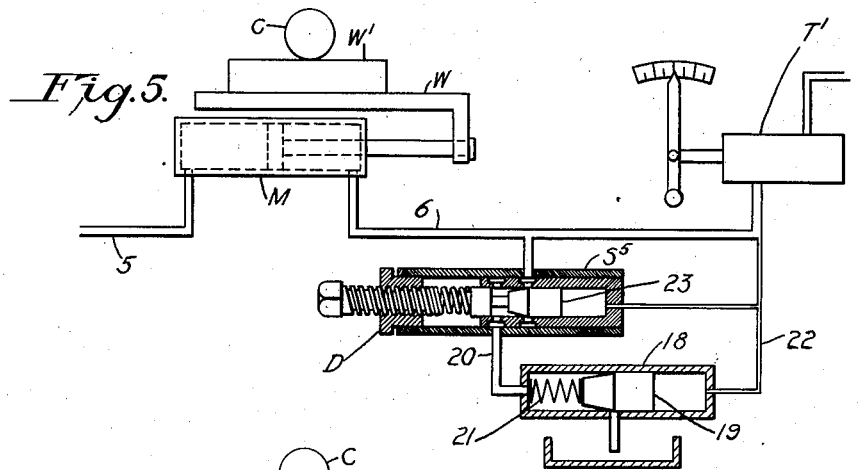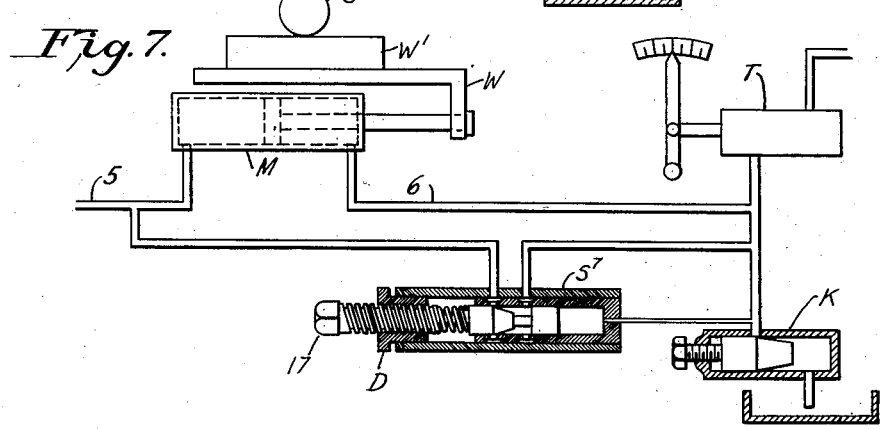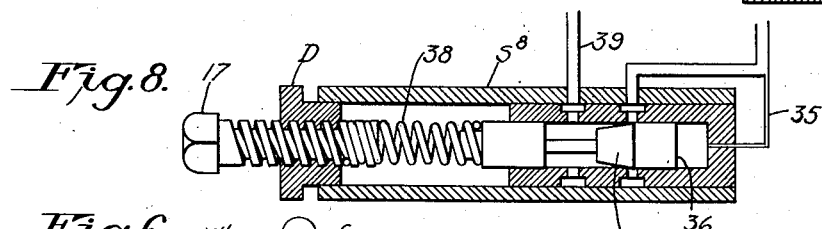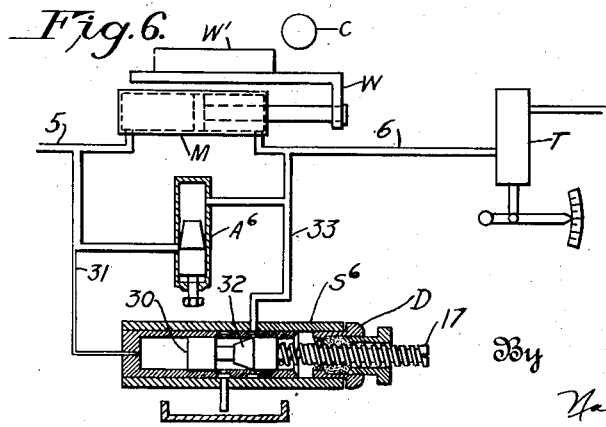

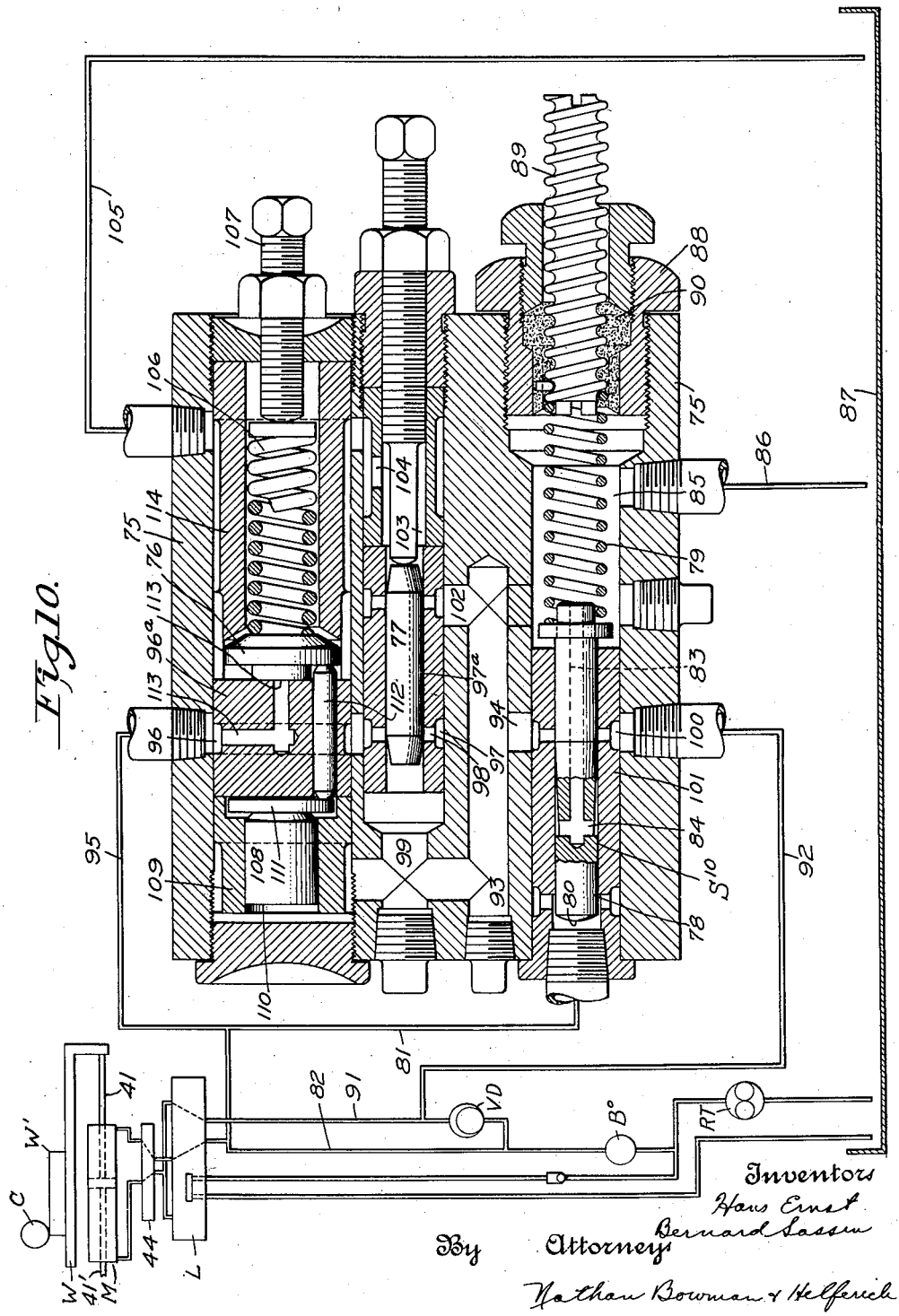

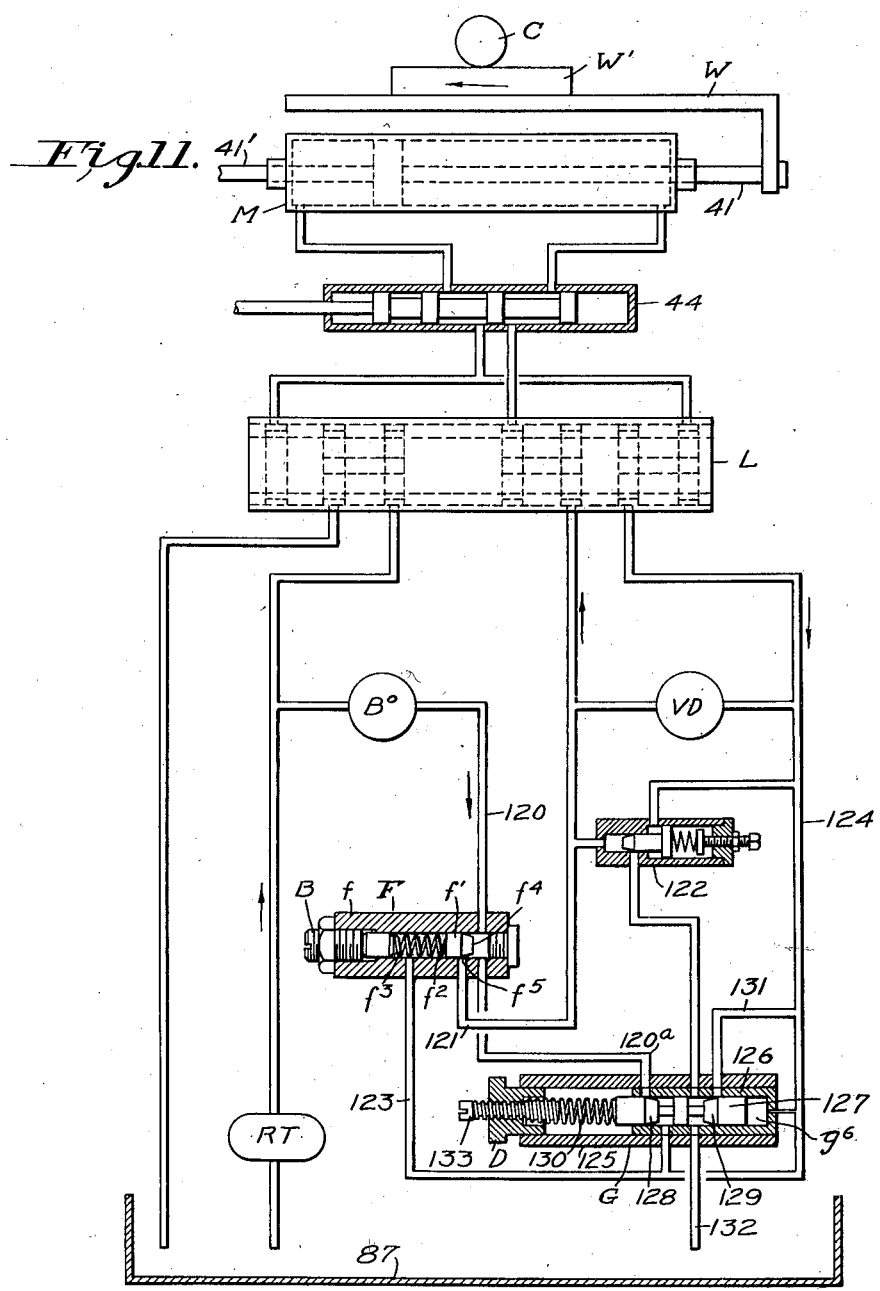

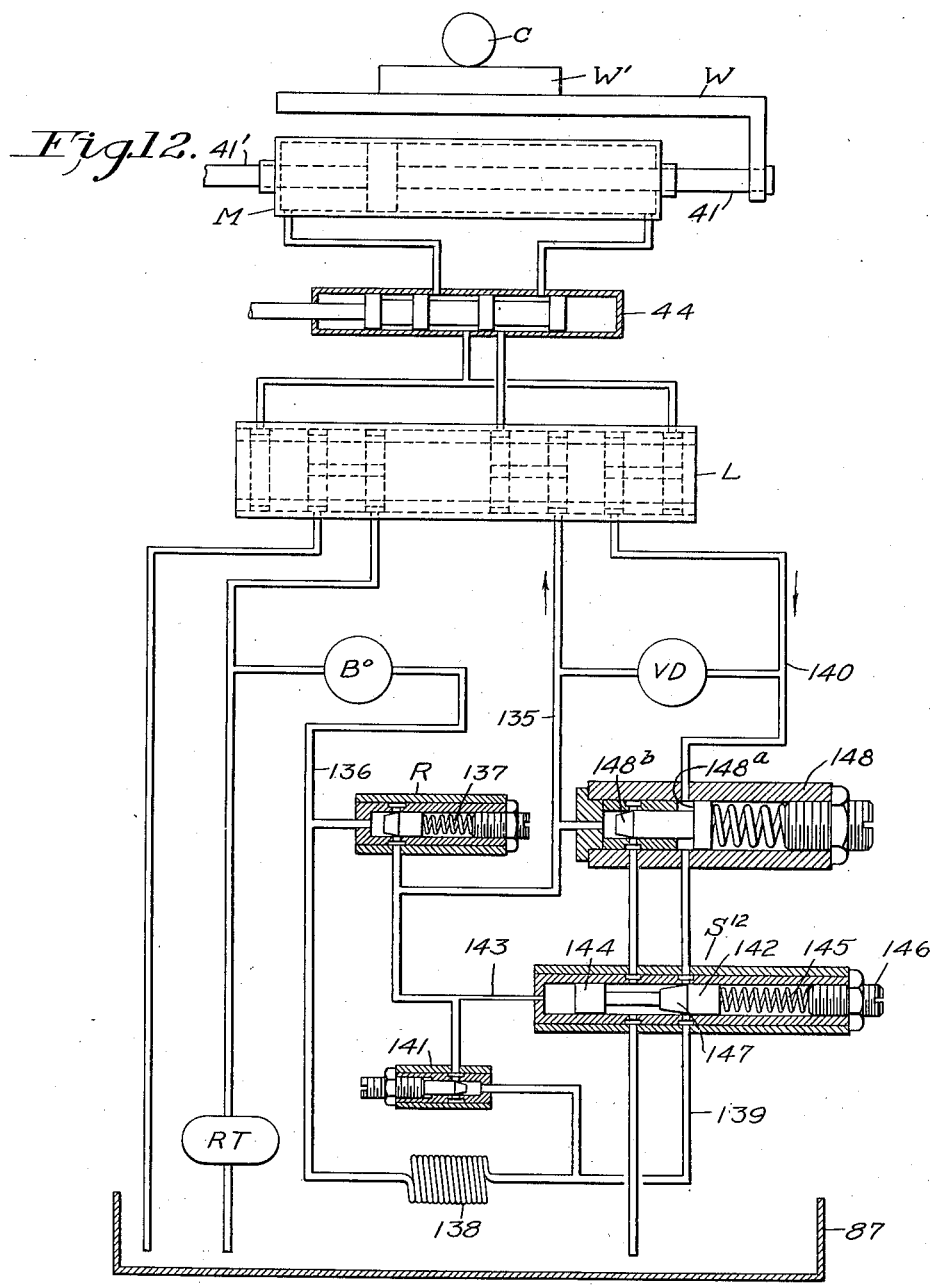

Patented June 25, 1935

2,006,311

UNITED STATES PATENT OFFICE 2,006,311

LEAKAGE COMPENSATOR FOR HYDRAULIC SYSTEMS

Hans Ernst and Bernard Sassen, Cincinnati, Ohio, assignors to The Cincinnati Milling Machine Company, Cincinnati, Ohio, a corporation of Ohio Application September 9, 1931, Serial No. 561,900

26 Claims. (Cl. 60—52)

This invention is directed to the remedying of the variable effects occurring in hydraulic propulsion systems as a result of unavoidable leakages of fluid from the normal path or space prescribed by the operating mechanism. Hydraulic power devices possess certain characteristics which, through a long process of development, have been rendered of exceptional value in many environments of which the machine tool art is an outstanding example. This application has become extensive despite the inability to obtain, or maintain, a desired close adherence between the indicated speed of operation and the actual rate of operation, in contrast to the unvarying relation notably characteristic of mechanical drives.

Even if it were possible, through the exercise of the utmost care and refined machining methods, to produce an operative hydraulic power device with its relatively moving parts free of leakage, such would be without the range of practicability. It is a recognized fact that leakages are unavoidable in commercial machines, and that these leakages are of such amount as to very materially affect the operation of the machine. Under a given temperature and pressure condition the graduations associated with the control element of any specific machine can, of course, be modified to correctly indicate the observed actual speed irrespective of the leakages. However, this would be of little value since such indication would be correct for only the particular temperature and pressure selected. This follows from the facts first, that the discharge through an orifice of a given area (leakage area) varies as the fluidity (inverse of viscosity) which varies as the temperature of the liquid; and second, that the discharge varies as the pressure difference. Insofar, as this discussion is concerned and for practical purposes it may be considered that the variation is in direct proportion to the pressure difference across the orifice; and likewise bears a definite ratio to the fluidity. Each of these properties varies through a considerable range in any specific system. A liquid which has been forced through a series of throttle valves and various apertures for a substantial period of time attains a temperature far exceeding that of the liquid in a "cold" machine. Likewise the pressures may vary through an exceedingly wide range dependent upon the work resistance. Such values, e. g., as 0 to 1000 lbs. per square inch are very common.

In attacking the problem of correcting or compensating for the various leakages under these varying conditions and for all types of hydraulic systems, it has been found that the various systems can be advantageously classified under two general headings in accordance with an opposite, but in each case, dominant characteristic thereof. Such classification is:

A: Those in which the feed rate controlling device regulates the discharge of fluid from the motor, and B: Those in which the feed rate controlling device regulates the supply of fluid to the motor.

In either of these cases, however, there are two kinds of leakages which materially affect the feed rate—leakage of fluid out of the control lines to points of lower pressure; and leakage of fluid into the control lines from points of higher pressure. While the causes of such leakages are the same in either system, the effect of the leakages are different. In an hydraulic system in which the rate control mechanism governs the supply fluid to the motor, leakage of fluid "out" of the supply lines produces a retarding effect upon the feed rate, while leakage of fluid "in" produces an advancing effect upon the feed rate. The converse occurs in a type of system in which the rate control mechanism regulates the discharge of fluid from the motor, to wit, leakages "out" of the control lines tend to advance the rate of travel, while leakages "in" the control lines tend to retard the rate of travel of the machine element.

Regardless of which system is used, the effect of the leakages upon the feed rate, for any given set of conditions, may present any one of three possibilities, firstly, that the leakage "in" exceeds the leakage "out"; secondly, that the leakage "out" is in excess of the leakage "in"; or thirdly, that the leakage "in" equals the leakage "out".

Since the last mentioned case would be of rare occurrence, and further would normally obtain for even the same system under one specific set of pressure conditions only, it may be considered for all practical purposes every system falls within one of the other two classes. As to these other two types of cases, a variation of any one or more of the conditions such as variations of temperature or pressure, will produce a variation of leakage values which may be to the extent of entirely reversing the character of the machine by converting the minor leakages ("in" or "out") into the major leakages. In other words, a given machine which operates at a speed in excess of the indicated speed under one set of conditions may operate at a speed less than the indicated one under a different set of conditions, or a different speed adjustment. Many factors may contribute to produce the foregoing described variations. It may be noted, for example, that pressures at certain points in the system may vary as the work resistance but not at the same rate. Also at a particular leakage area, though large, the leakage may be small in amount and constitute a small factor in the summation of leakages. However, for a different work resistance the pressure difference across this particular area may become relatively high and it then becomes a major factor in the total leakages. These characteristics will become more apparent from the consideration of any particular mechanism such as those noted hereinafter.

A condition which may be present in many circuits is that of a negative work resistance. Normally work is considered as offering a positive resistance to table movement. However, the reverse of this may be true. There may be a mechanical force e. g. urging the piston forward in the direction of feed which requires a resisting hydraulic pressure in the back line in excess of that in the forward line. Obviously, the leakages may be of entirely different character when a machine is operating under a negative resistance from those occurring when operating under a positive work resistance.

Certain types of milling machines offer an outstanding example of conditions to be met in this respect. Under one condition of operation the cutting tool may be rotating in a direction directly opposed to the relative feed between it and the work-table. However, the extreme reverse of this condition occurs when the cutting tool is rotating in the opposite direction with a "hook-in" cut acting to urge the translatable element in the same direction as the feed.

For any substantial cutting force the forward urge acting on the table will exceed the resistance to table movement and the back pressure on the piston exceed, therefore, the forward pressure. We have, then, the condition of a "negative" work resistance. A condition of this nature obviously requires a resistance to the discharge of fluid from the back line. Such a resistance forms a concomitant of the discharge regulated type of system and this type of system, most completely described herein, affords an illustration of the universal adaptability of the present invention.

As the work resistance varies from positive to negative, the pressures on opposite sides of the piston simultaneously vary, but inversely, with the pressure on the back line becoming greater than that on the forward line. The leakages correspondingly vary and, in fact, the leakages between the forward and back lines reverse in direction. This specific example illustrates the variations in leakages which may occur, including a case in which the "in" leakage may become an "out" leakage and conversely, dependent upon which side of the motor the rate control line is located.

In its broadest aspects the means employed for satisfying this complex problem involves the fundamental principle of maintaining an automatic balance in the rate control line between the total advancing leakage, and the total retarding leakage, at all values of work resistance, and accordingly at all operating pressures. The invention proposes the introduction into the system of artificial leakages, the total of which, combined with the natural leakages of the machine, result in a balance thereof; i. e. the summation of leakages, to which the rate control line is subjected, are made to equal zero. This artificial leakage may assume the aspect of an injection of fluid into, or an extraction of fluid from, the rate control line. Also the artificial leakage may be that produced by one or more leakage devices which automatically vary the amount of compensating fluid; or it may be the result of a more or less fixed artificial leakage associated with a variable artificial leakage. The variations in artificial leakage may be produced by variations in pressure across the artificial leakage areas; or by variations in the leakage areas. All of these more specific aspects will be made more apparent from the discussion hereinafter in connection with the drawings.

A notable characteristic of a type of circuit, like those referred to above, is the fact that the pressures at certain points in the working system bear a definite relation to pressures at other points therein. As the pressure at one point varies, the pressure at certain other points simultaneously varies. The variation may be inversely or directly proportionate but the relation exists. Further, such variations bear a distinct relation to the variation in work resistance from the extreme negative value to the extreme positive value within the range of the machine. This relation is taken advantage of in the present invention in automatically producing the proper amount of compensation. Through the incorporation in the circuit of one or more devices for enforcing an artificial leakage over the natural leakage, and causing this artificial leakage to likewise vary directly or indirectly as the pressure at some critical point in the system a continuous balance is accomplished.

A particularly noteworthy characteristic of this method of compensation is, that once a balance has been effected under a certain temperature this balance will remain substantially undisturbed under changes in temperature, since leakages in and leakages out across the respective areas will vary simultaneously in accordance therewith. A balanced system as thus devised is not only free of disturbance of changes in temperature of the particular hydraulic medium for which it was adjusted; but is unaffected, insofar as the ultimate balance is concerned, by the substitution in the system of an oil of a higher or lower viscosity from the original fluid at a given temperature. The same is true if the characteristics of the original oil should change in the course of operation. This complete independence from changes of viscosity in the hydraulic fluid is a factor of considerable importance, it will be apparent, from a practical standpoint.

In arriving at this point in the disclosure of the invention it is to be noted the compensation in this manner involves also the utilization of the phenomena heretofore referred to—that for practical purposes it may be considered that leakage, through the areas encountered in these devices, will vary as the temperature of the fluid; as the pressure difference across the area; and as the area changes in value. In accordance with these desiderata and principles upon which the accomplishment of the objects hereof are achieved an initial step in the application of the invention in a specific machine or type of machine is to determine its leakage characteristics. This may be conveniently done by selecting some critical but stable condition, such as the operation under idling conditions and selecting and recording the proper data. This is done for one temperature of the liquid; and then repeated for a different temperature. By means of a simple known method of calculation which involves the values of forward and back pressures and the "Saybolt" viscosity of the oil for the two temperatures, and the change in feed rate, the values of the leakage can be determined and which leakage—"in" or "out" of the control line—exceeds the other. The values obtained enable, also, the calculation of the feed rate which would be obtained when the leakages are made equal. A device is then introduced into the system and adjusted until the actual feed rate equals the calculated feed rate. For the condition (idling) selected, the summation of the leakages or the resultant effective leakage is zero, and the system is now balanced. With the adjustment made, the pressure differences will remain the same and the machine will remain substantially balanced, during idling, irrespective of changes in temperature since all leakage across the various areas will vary simultaneously and in proportion to the temperature changes. With, however, a change in work resistance, the pressure differences will change. These changes may not be, and usually are not, to the same degree. Frequently, they are not in the same direction. They will, however, all bear a definite relation to the changes in the work resistance as heretofore noted and by providing a compensating leakage means, which is responsive to variations in pressure at some critical point in the circuit, and which varies in the correct direction, the compensation for leakage will be correct for all working conditions.

The individual leakages throughout the system bear a simple relation to the pressure changes and, in fact, in most cases are depictable graphically as a substantially straight line curve. The summation of the leakages, omitting the artificial variable compensating leakage, also assumes values expressible as a simple curve.

The required variable compensating leakage will be, therefore, a curve of like nature. It becomes possible then to provide a valve device which is so arranged as to produce a compensating discharge which corresponds to values indicated by such a curve.

For a more complete disclosure of the manner of compensating for leakages and maintaining a balanced system reference may be made to the hereinafter detail description and the accompanying drawings wherein are disclosed typical adaptations of both the basic and the more specific aspects of this invention. In the drawings like characters of reference denote corresponding parts throughout the various views of which:

Figure 1 is a diagrammatic view illustrating a simple circuit of the supply regulated type; Fig. 2 likewise depicts an elementary circuit but of the discharge regulated type. Fig. 3 is similar to Fig. 1 with the incorporation therein of a variable opening leakage valve; Fig. 4 corresponds to Fig. 3 with the addition of pump means to provide a super-pressure; Fig. 5 shows an arrangement to provide a constant pressure difference across the leakage valve; Fig. 6 is similar to Fig. 2 but with the artificial leakage device made responsive to the forward pressure instead of the back pressure as in Fig. 2; Fig. 7 depicts an elementary circuit which provides compensation in a somewhat different manner from the preceding ones; Fig. 8 is similar to Fig. 7 but with the variator made responsive to variations in pressure in the forward line; Fig. 9 shows in more complete but somewhat diagrammatic form an entire circuit including the pump mechanisms and having incorporated therein a specific form of leakage compensating means; Fig. 10 discloses a complete circuit with leakage compensating means but is intended primarily to illustrate the unitary assembly of valve mechanisms including the leakage valves and an improved differential pressure or equalizing valve; Fig. 11 shows a complete circuit in which compensation for leakage is also provided under conditions of a negative work resistance; and Fig. 12 discloses a system for accomplishing in a different manner the balancing of leakages under conditions of both positive and negative work resistance, the variator in this case being a valve of a single continuous curve.

The two general classes of hydraulic system, distinguished according to supply or discharge rate control, are depicted in elemental and diagrammatic form in Figs. 1 and 2. Likewise these two figures illustrate in a simple manner a fundamental conception of the desiderata of compensation for leakages forming the subject of this application.

No attempt is made in these preliminary diagrammatic figures, to illustrate the various leakage points. Although leakage across the piston is, in a large proportion of the cases, the most obvious one, there are, nevertheless, innumerable other places such as various valves, pumps, metering devices, and joints both in the forward and in the back line which present areas likewise susceptible to leakage dependent upon the particular system.

In Figure 1 the rate controlling member T regulates the supply of fluid to the motor M; whereas Fig. 2 illustrates a system in which the rate controlling mechanism T¹ regulates the discharge of fluid from the motor. In these initial figures, the regulating devices T and T¹ are shown without detail of internal construction. It is to be borne in mind, however, that the illustrations herein are, in the interests of simplicity, mainly diagrammatic, and such devices may assume varied forms well known in the art for positively governing the volumetric flow in a line including special throttle valves which compensate for variation in pressure to maintain the volumetric flow constant, metering devices and positive displacement pumps. The regulating devices indicated at T or T¹ may be, of course, subject also to leakages in themselves and where no internal compensation is provided for such specific leakages it is contemplated that the means provided herein are designed to likewise compensate for those specific leakages. In general, in referring to the rate control line, the regulating device is included as part thereof. For a more specific example of one of these regulating devices reference may be had to the circuits of Figs. 9 to 12 in which an adjustable delivery pump of the positive displacement type is employed. A primary characteristic of these rate controlling devices is that of a positive adjustment of the rate of fluid movement, in association with some form of graduated scale to indicate the selected rate of feed. In Fig. 1 a pointer I connected to the manual adjustment for the regulating device T moves adjacent a graduated scale 2.

In accordance with the objectives of this description to disclose the principles of the invention without the introduction of unnecessary mechanical detail, the power device M is depicted in one of its simplest forms as a plain cylinder with reciprocatory piston. Likewise all distributing valve mechanism for reversing and stopping the motor is omitted since with a general understanding of the principles of the invention derived from its application in simple form, more complicated adaptations thereof under various specific conditions of differential pistons, and feeding in alternate directions, and other variable factors can be readily made, particularly in view of the more detail consideration of these matters hereinafter.

With respect to leakages, in the case of Fig. 1, it will be noted that leakage of fluid out of the rate control line 3, decreases the quantity going to the motor and retards the rate while leakage of fluid "in" to the rate control line increases the supply to the motor and advances the rate of movement.

Under the conditions of a positive resistance to movement of the table W carrying the work W¹, resulting when cutter C is rotating clockwise and the table is being fed to the right, the pressure in line 3 must be greater necessarily than the pressure in line 4. As a consequence there will be a retarding leakage from line 3 to line 4 in quantities determined by the pressure difference and total areas of the orifices through which this leakage can occur. Similarly, under the same conditions, with the system illustrated by Fig. 2, the pressure in line 5 must be greater than that in line 6 to effect a movement of the table W, and there will result a retarding leakage from the forward pressure line 5 to the back pressure line 6. In the case of the discharge regulated type of system of Figure 2 there also will be a leakage from the back pressure lines 6 to the reservoir, which tends to advance the feed rate and if the leakage into the back pressure lines equals, or is made to equal, the leakage out of the back pressure lines, the resultant effect of the leakage on the idling feed rate is reduced to zero. In practice it is usually found that one exceeds the other and compensation must be made for the difference, and a device introduced into the circuit which will afford the necessary compensation for leakages.

Such a device may assume varied forms, the adjustable choke valve A¹ and A² illustrated in Figs. 1 and 2 respectively, representing one form of device for compensating for the initial or natural leakage out of the rate control line of the system when the machine is operating under a specific condition such as that of idling. In Figure 1 the valve plunger $a$ is adjusted by screw $b$ to determine a flow of fluid from the supply line 7 to the forward line 3. The amount of fluid thus injected, for any particular machine, will be determined, of course, by suitable tests.

In Fig. 2 the valve A² serves to inject fluid into the back line 6 from the forward line 5. If it is found that the leakage out of the back pressure line exceeds the leakage from the forward pressure to the back pressure, complete compensation for idling conditions can be produced through valve A²; but if it is found that the leakage from forward pressure to back pressure is in excess of the leakage from back pressure to reservoir, then an additional compensation is made through a second valve S². By adjusting the sleeve nut D of this valve the relationship between the valve plunger 8 and the holes in the valve sleeve will be changed whereby an initial artificial leakage out of the back pressure line is provided.

Once the foregoing adjustments have been made, and which serve to make the resultant effective leakage zero, under idling conditions, it will remain zero regardless of the temperature of the oil. However, the leakages will vary under different cutting conditions, and in different machines in accordance with their respective characteristics and in order to maintain a balance under all conditions further adjustments are made available in the valve S².

Referring to the details of this valve, Fig. 2, it will be observed that it comprises an outer bored casing member 9 within which a sleeve member 10 is secured. Within the sleeve is the slidable valve piston 8, previously referred to, one end of which is acted upon by fluid pressure entering port 11 from the back pressure line 6 in opposition to an adjustable spring 12. Intermediate the ends of the valve plunger 8 is formed an inclined reduced portion 13 which offers a restricted passage to the flow of fluid through port 14 and out the port 15 to a point of lower pressure such as, in the instant case, to the reservoir 16. Now, when the machine is idling, if the nut D is moved inwardly, toward the left in this figure the plunger 8, spring 12 and screw 17 are all moved together so as to vary the relationship between the valve portion 13 and the holes in the sleeve 10 and which movement increases the amount of flow out of the back pressure line. But if the nut D be adjusted outwardly to the right, the flow will be decreased. The adjustment toward the left to provide an initial leakage through valve S² is made only when the leakage, under idling conditions, from the forward pressure to the back pressure is in excess of the leakage from the back pressure to the reservoir.

Having established an initial balance of leakages under idling conditions, the valve S² will also automatically function to compensate for leakages under conditions of added positive work resistance. When the cutter C is in engagement with the work and rotating in such direction as to impose a positive resistance to the movement of the work table W, the pressure in line 6 will fall, and consequently the spring 12 will move the plunger 8 toward the left, thus increasing the flow from back pressure to reservoir, and thereby automatically compensating for the increased natural leakages from forward to back pressure lines due to the increased pressure difference.

Compensation for variation in conditions as e. g. the amount of leakage on different machines under working conditions, is made by adjusting the set screw 17. This adjustment varies the number of active coils of the spring 12 and in this way it is possible to vary the pressure required to shift the valve plunger a unit distance—by varying its spring characteristic—without the necessity of substituting a spring of a different value. Or in other words, for any given pressure, the amount of shifting of the valve plunger with respect to load, and thereby the area of the variable compensating leakage orifice, may be varied to suit the leakage factor of each machine. It is known that for a constant pressure difference the leakage is very nearly proportionate to the area of the orifice. However, in the case of Fig. 2 and similarly in various circuits hereinafter described, the rate of leakage through the pressure responsive valve S² is dependent upon the extent of opening which in turn is dependent upon the fluid pressure exerted thereon. In addition, the leakage across the valve S² is dependent upon the pressure difference which varies as the pressure in line 6. The quantity Q therefore becomes a function of the square of the pressure in line 6, which defines a parabola and graphically, or algebraically, informs us that the contour of the active portion of the valve member 13 should, for correct compensation, at all pressures, be parabolic.

Practice demonstrates, however, that by a slight departure from the ultima of construction, to wit, making the valve portion conical instead of parabolic, a less expensive valve can be made and one which, for all practical purposes, provides sufficiently accurate compensation.

For perfect compensation using a conical valve, it would be necessary to make the pressure difference between back pressure and the outlet across valve $S^2$ a constant amount in order that, instead of leakage taking place between the back pressure and the constant low pressure, the leakage takes place between back pressure and a pressure lower than back pressure by a constant fixed amount. Such a system is illustrated diagrammatically by Fig. 5 of the drawings which, except for certain details of construction, is similar to the systems heretofore described. The valve member 18 of this figure, it will be observed, has the piston face 19 exposed to the back pressure; and a like area opposed thereto subjected to the pressure in line 20. This opposing pressure is supplemented by the spring 21 and as a result the pressure in line 20 will remain at a value lower than the back pressure in line 22 by a fixed amount, and the pressure differential across the leakage by-pass valve $S^5$ will remain at a fixed value. Under such conditions the only effective variable is the pressure variation in the back line acting on the piston face 23 and the slope of the valve becomes a straight line function.

The regulating or rate control device exemplified by the mechanism designated T or $T^1$ may operate in any of the well known manners commonly employed, including manual or automatic means. In Fig. 2, e. g. the adjustment is determined by the cam $t$ rotatable with the gear $t^1$ on the shaft $t^2$. The member $t^3$ can be assumed to be urged against the cam by a suitable spring or other impositive means. A rack $t^4$ meshes with the gear $t^1$, which rack may be operated either manually or automatically through association with an element movable in accordance with the machine cycle; e. g. a cam plate $t^5$, adjustably carried by the work table W, which has been previously cut or contoured in conformity with the character of the workpiece. A second cam $t^6$ actuated by the lever $t^7$ is also illustrated for effecting manual adjustments to the throttle $T^1$ or which may be set in a given position thereby to act as a limiting device for controlling the maximum or minimum adjustment to be effected automatically to the rate control device $T^1$.

In connection with Fig. 1 there was described the broad application of leakage compensation to a system of the supply regulated type. Figs. 2 is directed to a system of the discharge regulated type and provides for the contingency in which the initial leakages into the rate control line during idling conditions are found to be in excess of the leakages out of the rate control (back) line and the net leakages could not, therefore, be compensated for by the valve $A^2$. In addition provision was made to compensate for variation in leakage resulting from variable working conditions with the attendant fluctuation in pressures in the system. These additional factors, it was shown, could be peculiarly well met through the incorporation in the system of the shuttle valve $S^2$.

In Fig. 3 it is shown how this same complete automatic leakage compensation can be effected in the first mentioned type of system referred to as the supply regulated type. If, under idling conditions, the natural leakages out of the rate control line 24 are in excess of the in-leakages, the initial adjustment therefor is made through a proper opening of the valve $A^3$. Further compensatory artificial leakages to counterbalance increased leakages under working conditions are effected through subjecting the variator of valve $S^3$ to variations in pressure in the rate control line 24, in this case the forward line. This is accomplished through the application of fluid pressure to the valve piston face 26 of the valve plunger 25, fluid being directed thereto through the pipe 27. Thus the same variations in pressure causing variations in leakage are utilized to correspondingly vary the amount of compensating fluid.

In Fig. 1 a source of fluid under constant pressure was assumed for the line 7 and which pressure was higher than that in line 3. The same is true with regard to lines $24^a$ and 24 respectively of Fig. 3. In case this fluid of higher pressure were not obtainable from the main supply line ($24^b$ of Fig. 3) a mechanism similar to that of Fig. 4 could be employed to provide a super-pressure for the fluid to be injected. The circuit of Fig. 4 includes the regulator T and valves $A^4$ and $S^4$ functioning in the same manner as the regulator T and valves $A^3$ and $S^3$ of Fig. 3. In Fig. 4, however, an auxiliary source, of higher pressure fluid is provided through the medium of pump B discharging into the line 28. A differential valve H is connected to line 28 in which the movable plunger $h$ is subjected to the pressure, in one direction, of spring $h^2$ as well as the pressure in the forward line $29^f$, whereas the opposed piston face of equal area is connected directly to the pump discharge line 28. Accordingly, the pressure in the latter line will be greater than that in the line $29^f$. Any excess fluid from the pump B will be discharged back into line 29, through pipe $29^a$. While Figure 4 indicates this source of higher pressure as an auxiliary device it is to remembered that the figure is essentially diagrammatic and normally the pump B may form a major element in the circuit such as the pump $B^o$ employed in the circuits shown more completely in Figs. 11 and 12.

While Figs. 2 and 5 e. g. illustrate fluid connections and an arrangement for subjecting the shuttle valve or variator S to pressure changes in the back pressure; it is to be understood that, in systems where the forward pressure varies simultaneously with variations in the work resistance and in the back pressure, the same artificial leakage means may be made responsive to changes in the pressure of the forward line; or responsive to a combination of the changes in the forward and back pressure lines. The details of the system in which the forward pressure varies in such manner is shown e. g. in Figures 9 to 12 hereinafter referred to. Fig. 6 shows a valve $S^6$ in which the forward pressure acts on the piston face 30 through the branch 31, and the conical portion 32 of the valve is reversed. The valve bleeds variable amounts to the reservoir from the branch 33 leading from the back line. Assuming such a system as that just noted, as the work resistance increases the forward pressure increases and the back pressure simultaneously decreases. Accordingly there will be an increase in the natural leakage into the back line from the forward pressure line. However, this is balanced by increased leakage across valve $S^6$ as the valve is moved further to the right under the action of the increased pressure in line 31, and compensation is accomplished, therefore, as before. To compensate for the effects of leakages under idling conditions, a valve $A^6$ which is adjustable to suit the leakage requirement may be employed to inject compensating fluid from the forward line into the back line.

Another type of system which approaches the problem of leakage compensation from a different angle is illustrated in Fig. 7. In accordance therewith an adjustable, but normally fixed or constant, artificial leakage area from the back pressure line 6 to the reservoir is provided through the valve K. In this case the valve K is adjusted to provide an artificial leakage out of the back pressure line equal, at least, to the maximum natural or inherent leakage into the back line which would be encountered within the range of the machine. The latter normally would occur under maximum cutting resistance. In conjunction with valve K a variable leakage device, responsive to working conditions, is introduced into the system to compensate for the conditions within the wide and usual working range wherein the cutting resistance is less than the maximum. This device is exemplified by the valve $S^7$ which is a form of the variator or shuttle valve heretofore considered. A primary function of the valve $S^7$ is to bleed a variable amount of fluid from the high pressure forward line 5 into the back pressure line 6. The position of the valve member, it will be seen, is a function of the back pressure. As the work resistance decreases the back pressure will inversely increase accompanied by a corresponding increase of fluid by-passed into the back pressure line from the forward line through the valve $S^7$. As a general characteristic of this system the leakage through the variable opening valve $S^7$ is into the back pressure line, which leakage is greatest when idling, and reduced to a low value when the work resistance increases to its maximum within the range of the machine to which the system is applied.

The adjustable reaction member D provides an additional method of controlling the initial leakage compensations.

Fig. 8 is a fragmentary view which, when considered with Fig. 7 discloses a system similar thereto, but with the fluid connections altered such that the variable in-leakage valve $S^8$ to the back pressure line is made responsive to variations of pressure in the forward line. Such means for automatically controlling the valve $S^8$ is of course dependent upon the system being of a type described in connection with Fig. 6; and of which the arrangement shown in Fig. 9 is an example having its differential valve 51 which serves to maintain a definite relation between the rate of change in the forward and back pressure lines as the work resistance varies. In accordance with Fig. 8 fluid is conducted from the forward line through a branch 35 to act on the piston face 36 of the valve member 37 against the force of the spring 38. The pipe 39 directs the by-passed fluid into the back line. The valve opening, therefore, varies inversely as the forward pressure; whereas in Fig. 7 it varies directly as the back pressure. But in each case the valve opening varies inversely as the work resistance, and the compensating fluid injected varies in like amounts with the variations in the natural leakages.

A complete adaptation of the leakage compensating means thus far described is disclosed in connection with Fig. 9. Although this figure is likewise somewhat diagrammatic, the omitted details of automatic and manual control or operation can readily be supplied by one skilled in the art. If desired, reference may be made to British Patent #297,104 of March 28, 1929 showing a complete organization of this nature including typical actuating mechanisms.

All the essential elements of the hydraulic system are disclosed in Fig. 9 and comprise the power motor M which includes the piston 40 connected through the piston rod 41 to the work table W on which is mounted the work $W^1$. A milling cutter is illustrated at C indicated as rotating in a counterclockwise direction. Pipe lines 42 and 43 lead to opposite ends of the cylinder from the valve casing 44 in which is located the stop valve member 45. A selector valve L is connected to the valve casing through the single line 46 and the divided line 47. The details of the stop valve and of the selector valve L and the manner of their operation need not be described here for the purposes of the present invention. Suffice it to state that the mechanism in question may be as shown in the British patent above referred to; or it may be any other mechanism capable of governing the supply and exhaust of fluid with respect to the opposite ends of the motor M in accordance with a desired cycle.

It will be noted in Fig. 9 and subsequent figures that a rod 41' projects from the piston 40 in the direction opposite to the piston rod 41. With such an arrangement all variations or errors are eliminated which might result, under certain conditions of operation and pressures, when a differential piston is employed. In the more or less diagrammatic Figures 1 to 8 inclusive this factor was not discussed particularly since these preceding figures are intended to illustrate the broader aspects of the invention rather than its adaptation to universal conditions. Furthermore, it is to be noted that even with differential piston areas involved, in a one-way feed machine where the stroke in one direction is entirely an idling stroke no error or departure from a complete balance of leakages, once properly established, would normally occur during the critical period when the regulated feed was effective. Also, in any case where an error or variation of this nature might occur, the extent thereof would be dependent upon the comparative values of the differential piston areas, and in many instances where the piston rod e. g. is merely of such size as is required to withstand the mechanical forces, any error attributable to this factor, as a practical matter, may be neglected.

It is not to be overlooked, however, and due consideration must be given to the fact that in certain special cases using a differential piston, the extreme condition may exist that, in reversing the rate control line from one side of the piston to the other and with the same work resistance in either direction, the direction of leakage may even be reversed. That is, owing to the difference in piston areas, with the same work resistance, the pressure in pounds per square inch in the forward line may be greater in one direction of movement than the pressure in the back line; whereas in the reverse direction of movement the pressure in the forward line may be less than in the back line.

The hydraulic circuit illustrated includes the rapid traverse pump RT which may be a gear pump adapted to supply fluid at a rapid rate through the line 48 and suitable ducts in the valve means; a variable displacement pump VD arranged to receive fluid from the back line 49 and direct it to the forward line 50; and a booster pump B⁰ capable of creating a super-pressure and supplying a small amount of fluid to combine in the forward line with the discharge from the pump VD. It may be briefly stated that the pump B⁰ serves, in the circuit shown, the compound function of make-up pump and to maintain in the forward line a sufficiently high pressure when called upon to meet the conditions of maximum pressure required. The pump VD, in its usual form in this type of circuit, is of the variable displacement type heretofore referred to. It will be seen that the system of Fig. 9 is of the type in which the rate of feed is determined through control of the rate of discharge of fluid from the back pressure line; and that the pump VD comprises the means for so controlling the rate of discharge. The pump VD, in fact, functions as a metering pump being one specific form of the means, for controlling the rate of flow, broadly referred to in connection with previous figures. As heretofore explained, and as shown in the British patent referred to, it is contemplated that this metering device in whatever form employed has associated therewith, means for selectively adjusting it to provide any desired rate within its range and that normally required of the machine, the adjusting means being employed in conjunction with a graduated indicator. Such an adjustment forms part of the details of construction disclosed in the said British patent, and is, in fact, a common feature of this type of pump or escapement device.

The hydraulic system of Fig. 9 includes a differential valve 51 which may or may not be employed in these various systems dependent upon the particular conditions and purposes. Some form of means of this nature is essential, however, where automatic adjustment of the leakage variator is dependent for its functioning upon variations in pressure in the forward line. Furthermore a differential valve means of this general nature forms an element in the particular type of commercially known hydraulic system adopted for illustration of our invention, and it becomes convenient to include it herein. The piston area 52 of the slidable member 53 is subjected through pipe connection 54 to the pressure in the back line. A tapered portion 55 is exposed to the pressure of the forward line 50 through the branch pipe 56 and controls the release of excess fluid from the forward line to the exhaust line 57. A spring 58 opposes the fluid pressure exerted on the valve. The details of valve 51 will be enlarged upon in connection with Fig. 10 but for the time being it may be noted that it serves primarily to prevent the building up of excessive pressures in the forward or back line, while at the same time maintaining a definite relation between their rate of change under changes in work resistance. For example, if the back pressure decreases, through increase in work resistance, the forward pressure will increase by a proportionate amount.

The functioning and adjustments for the leakage compensation means will be apparent, it is believed, from a consideration of the principles discussed in connection with the preceding figures. The valve A⁹ provides an initial artificial leakage from the forward line into the back line to compensate for leakage effects under idling conditions. As heretofore noted, if these initial leakages into the back line are in excess of the leakages out of the back line, an initial adjustment can be made at the sleeve member D of the valve S⁹ to provide the proper release of fluid to the exhaust line 61 from the line 62 connected into the back line. In the present case the valve A⁹ is also so arranged that if the piston member 63 is adjusted to the left a sufficient distance it may optionally be employed to by-pass a selected flow from the back line directly to the exhaust. The shuttle valve S⁹ differs from those in circuits described previously in that its position for compensation of leakage under and during variable working conditions is made a function of variations in both the forward and the back pressure lines. The valve member 64 is subjected at the right end to the pressure of the back line, and at its left end to the pressure of the forward line by reason of the pipe line connection 65. The spring 66 acts also in the same direction as the back pressure, the screw 67 being provided, as in previous cases, to vary the spring characteristics as the environment and conditions may require. The artificial leakage through the valve is from the line 62 through a central bore 68 which has a lateral opening 69 into the casing chamber. With the initial balancing of leakages under idling conditions having been made through the valve A⁹ as described, variations of leakage to maintain a balance under variable work resistances are then automatically effected through the variator S⁹. For example with an increase in the work resistance the pressure in the back line will decrease, and as a result of the effect of the differential valve 51, the pressure in the forward line will increase by a proportionate amount. The change in pressure in the forward line, under the usual proportions adopted for the differential valve 51, will be greater in actual pounds than the change in the back line. As a consequence the valve member 64 will be moved to the right in Fig. 9 to increase the leakage therethrough out of the back line and compensate for increased natural leakages into the back line.

As a matter of particular importance from the viewpoint of commercial practicability the various valves relating to the leakage compensation and also, if desired, the differential pressure valve indicated diagrammatically at 51 in Fig. 9, may be conveniently associated in a single compact unit. Such a unit is shown in Fig. 10. The fluid connections thereof and the principle of operation is essentially that of Fig. 6 with the detail elements including pumps, valves, etc. forming the organization of Fig. 9 incorporated therein.

The valve unit has a main casing 75 within which is located the differential valve element 76, the normally fixed but adjustable leakage valve 77, and the shuttle valve S¹⁰ which includes the valve element 78 variable as to position under the influence of variable forward pressure and the spring 79. Forward pressure is directed to the piston face 80, through the branch pipe 81 leading from the forward pressure line 82. The valve member 78 has a longitudinal bore 83, the left end of which communicates with lateral ports 84 and the right end with the chamber 85 leading through the pipe 86 to the reservoir 87.

The nut 88 provides a means for adjusting the initial position of the valve member 78, and the screw 89 a means for varying the characteristics of the spring 79, both in the manner and for the purpose heretofore described in connection with the various specific circuits, including that of Figure 6. The sleeve 90 forming the nut for the screw 89 is made of soft metal and provides packing means against leakage.

The valve $S^{10}$ serves to determine, it will be noted, the amount of leakage from the back line 91, which has a branch line 92 leading to the valve 78 through port 100 and connected also to the chamber 93 through the port 94. Flow to the exhaust occurs through the passages 84 and 83, chamber 85 and exhaust pipe line 86. The adjustable valve 77 corresponding to the valve $A^5$ of Figure 6, in the position shown, serves to permit a leakage there-across from the forward line to the back line. This occurs through the fluid passages consisting of the branch line 95, the annular channel 96 in the block $96^a$, annular channel 97 in the sleeve $97^a$ of valve 77, lateral openings 98 in said sleeve, and through chamber 99 connecting with the chamber 93. For unusual conditions the valve member 77 may be adjusted to the left whereby fixed leakage occurs from the back line through the opening 102, from the chamber 93, into the chamber 103, through port 104 and out through the pipe line 105 to the reservoir.

In this unit construction of Fig. 10 the differential valve means is shown in a specific form differing somewhat from that shown more or less diagrammatically in the various other figures. In this form the valve element 76 is urged in one direction by the spring 106 varied as to tension through adjustment of the screw 107. In opposition to the spring, a plunger 108, slidable in the sleeve 109, is subjected on the piston face 110 to the back pressure which has access thereto through the chamber 99. The disk 111 which may be integral with the plunger 108, bears against slidable pins 112, (only one being shown), the opposite ends of which are urged against the valve element 76. The pressure from the forward line is also imposed on the valve member 76 through fluid entering the bore 113 leading from the forward pressure branch line 95. The chamber which contains the spring 106 and the sleeve 114 is, as heretofore noted, connected to the exhaust line 105. Valve 76, therefore, constitutes a relief outlet for the forward pressure line.

It will be noted that increasing pressures in either the back line or forward line tend to open the valve, and if either become excessive, such opening will occur, and pressure in the forward line relieved, which necessarily simultaneously relieves pressure in the back line. Also, as a characteristic of the valve, if the back pressure decreases, through e. g. increase in work resistance, the forward pressure will increase by a proportionate amount. The movable element 76 is, it will be noted, exceptionally light and, as a matter of fact, will be responsive to rapid fluctuations in the pressures in the lines and maintain a certain relation between the rate of change of pressure in the back line and the rate of change of pressure in the forward line, in addition to relieving any excessive pressure in the forward line.

Negative work resistance

In perhaps the majority of cases power devices operate against a resistance which is variable but continuously positive. The treatment of this invention, in connection with particular circuits, has been more or less limited in the foregoing applications to environments of such nature. However, such conditions are by no means universal; but are found to be the opposite in many cases. In other words, a power device may, through a part, or all, of its cycle, be subjected to a negative resistance in which some external force is imposed on the movable element acting in the same direction as that of the movement. The conditions and directions of leakage are, therefore, reversed, in part at least, which immediately suggests the presence of radically different problems of compensation for leakages. It will be shown, however, that the present invention is based on fundamental principles remarkably adapted to cope with such reversal of characteristics.

In contemplation of the objects of this description and illustration to reveal the general adaptability of the invention, a milling machine has been selected as being a device which involves the varying and opposed operating characteristics noted.

When the machine is set up so that the cutter is operating with the feed (downward or hook-in cut) the tool has a tendency to assist in the propulsion of the table. The work resistance then becomes negative in its effect upon the forward pressure; and the back pressure, instead of being the lower of the two, becomes the higher pressure. When the machine is entirely free of resistance, including that of friction, the pressures on opposite sides of the piston approach each other in value and for the purpose of illustration may be assumed to be, for a specific example, as 400 lbs. per square inch. As soon as the work is engaged by the cutter, the cutter itself exerts a mechanical urge on the table in the same direction as that of the hydraulic feed equal to, let us say 500 lbs. per square inch of piston area. If the system is such that the forward pressure is maintained at a constant value, the forces now tending to propel the table are 400 lbs. hydraulic pressure plus 500 lbs. mechanical pressure, or a total of 900 lbs. per square inch acting on one side of the motor. Opposed to this total force was the 400 lbs. hydraulic back pressure which, it is clear, immediately rises to a value approximating 900 lbs. Hence, with an hydraulic back pressure of 900 lbs. and an hydraulic forward pressure of 400 lbs. there will be a leakage of fluid from the back pressure lines to the forward pressure lines in amounts proportionate to this pressure difference and, therefore, proportionate to the value of the negative work resistance.

It may be here stated that the values above mentioned are illustrative only, and under the simple conditions mentioned the forces might tend to rise to much higher values and it has been found desirable in many instances to introduce into the system a device for automatically adjusting, or partially equalizing, the opposed hydraulic values relative to each other, and in proportion to the work resistance. Such a device may assume the form of the differential valve 51 of Fig. 9. Irrespective, however, of what reduction of total pressures is effected there will necessarily remain a preponderance of pressure in the back line under conditions of a negative cut to balance the "pulling" effect of the cutter. The net result may be a pressure difference of 500 lbs., or very much higher, which causes a leakage of fluid, in this case, from the back pressure line to the forward pressure line with a consequent increase in rate of feed over the indicated setting. This leakage may be aptly termed an advancing leakage in circuits where the rate is controlled through regulation of the discharge.

Compensation for leakages when the work resistance is negative, as described immediately above, is based on the same general principles as those applied in the case of leakages occurring under conditions of positive work resistance, namely, an adjustment of fluid in the rate control line. In its more specific aspects the invention involves, therefore, where the work resistance is negative, an injection of compensating fluid into the rate control line of a discharge regulated type system, and an extraction of fluid from the rate control line in the case of a supply regulated type of system. In either type of circuit the back pressure must necessarily be higher than the forward pressure.

In the discharge regulated type of circuit, where an injection of compensating fluid is required, a source thereof must be sought other than the lower pressure forward line. In the specific hydraulic system described herein it is convenient and desirable to derive the balancing high pressure fluid from the high pressure booster pump B⁰ previously referred to.

Fig. 11 illustrates somewhat diagrammatically how this may be effected. A valve F is shown as connected with the discharge side of the high pressure pump B⁰ by means of the conduit 120. This control valve comprises a casing member $f$ in which there is slidably mounted a valve piston $f^1$, one side $f^2$ of which is acted upon by the back pressure fluid supplemented by the value of an adjustable spring $f^3$; and the other side $f^4$ of which is subjected to the pressure of the fluid from the pump B⁰. The end $f^4$ of the valve plunger is tapered slightly and cooperates with a port $f^5$ which communicates with the conduit 121. This last mentioned conduit connects with the forward pressure line as well as with the reservoir through the differential relief valve 122. Branch line 123, connected to the back pressure line 124, subjects the side $f^1$ of the plunger to the back pressure. A branch line 120ᵃ connects the super pressure line 120 with a leakage control valve G which is constructed similar to the variator S³, S⁴ etc. hereinbefore described in connection with other figures, except that in Fig. 11, the variator G is responsive to variations in the back pressure and is used to control both "in" and "out" leakages. Thus, the super pressure in the branch line 120 will always be greater than the back pressure in line 123 by a constant amount, to wit: the unit value of the spring $f^3$ of the regulating valve F, thereby avoiding even the slight deviation from exactitude of balance for all working pressures, which might otherwise obtain with a simple conical valve.

In its modified form the variator G comprises a casing 125 which, for convenience of manufacture, is provided with an apertured sleeve member 126. Within the sleeve member 126 is slidingly fitted a piston valve element 127 having reduced portions 128 and 129 that cooperate with the holes formed in the sleeve, as will later be explained.

An adjustable spring 130 exerts a force on one end of the valve plunger in opposition to the pressure of the fluid acting in the chamber $g^6$. In this instance, the chamber $g^6$ is connected to the back pressure in line 124, and any variation, therefore, in this pressure immediately causes the valve plunger 127 to take up a new position of equilibrium.

The super pressure from the pump B⁰ enters the valve through the line 120ᵃ, passes the resistance presented by the tapered portion 128 of the valve element 127 and then enters the back pressure line 124. In this way of balancing retarding leakage "in" to the back pressure line is effected, and in amounts proportional to the value of the negative work resistance. As the mechanical forward urge on the table increases, the back pressure increases and the greater will be the natural leakage from the back pressure lines to the forward pressure lines and, therefore, the valve taper 128 is so related that an increase in back pressure decreases the resistance at 128 permitting an increase in flow from super pressure to back pressure to compensate for the natural leakage "out" of the back pressure lines. The value of the spring 130 and the number of active coils thereof is, of course, adjusted to suit the leakage factor of the particular machine.

The valve G, however, serves also to regulate the artificial "out" leakage when cutting against the feed, at which time the back pressure is lower than the forward pressure. This is effected in substantially the same manner as heretofore explained in connection with other figures, but will be restated here. A conduit 131 connecting with the back pressure line 124 conveys fluid to one of the openings in the valve sleeve adjacent the tapered portion 129 formed on the valve element 127. When the work resistance is "negative" the line 131 will be completely closed, but when the resistance is "positive" the super pressure line 120ᵃ will be completely closed and line 131 opened more or less, depending upon the adjustment of the spring 130 and the value of the back pressure. When back pressure line 131 is opened, fluid passes or is bled "out" of the back pressure lines in amounts sufficient to balance the retarding "in" leakage. This artificial "out" leakage is controlled by the resistance at 129 of the valve G, and passes directly to the reservoir through the line 132.

The valve G is likewise adapted to be adjusted to provide an initial balancing "in" leakage when the machine is idling, this adjustment being effected as in previous cases through the medium of the adjusting screw D, the turning of which moves the valve element 127, spring 130 and screw 133 as a unit relative to the holes in the valve sleeve 126, and in this way the initial opening at 128 or 129 of the valve may be adjusted or varied to suit the leakage requirements of the particular machine under idling conditions. After this adjustment has been made the screw 133 is actuated to vary the number of active coils in the spring member 130, thereby to regulate the effect on the valve plunger of variations in the valve actuating pressures. It is to be noted in general that the adjusting screw D can be employed to adjust for variations in natural leakage in different machines under conditions of positive cut; and the screw B of the valve F then utilized to adjust the leakage characteristic of the mechanism when the machine is operating under conditions of a negative cut.

By reference to circuits heretofore described it will be apparent that the valve G can alternatively be made responsive to variations in forward pressure as a means of varying the amount of the compensating fluids.

Fig. 12 shows another type circuit derived from an application of the principles of our invention, this being a circuit which, like that of Fig. 11, functions to compensate for leakages under conditions of both positive and negative work resistance.

The mechanism of this circuit includes the various pumps and main distributing valves of the circuits previously described. In addition the system is provided with valve R which may be an ordinary relief valve which permits the pump B° to discharge into the forward pressure line 135, and provides a supply of fluid under super pressure in the line 136 made equal to, or slightly greater, through adjustment of spring 137, than the maximum pressure ever attained in either the forward or back line.

A calibrated resistance coil 138 is provided in the super pressure line 136 which is connected to a branch 139 of the back pressure line 140 and permits a small injection of fluid into the back line which, it will be seen, varies in amount inversely as the back pressure. Compared with the work resistance the amount will vary directly as the positive work resistance, and inversely as the negative work resistance.

A valve 141 is also inserted in the circuit provided with an adjustable, but normally fixed, flow opening connecting the forward line to the back line. The flow through valve 141, it will be noted, may be in either direction dependent upon the relative pressures on opposite sides of the power piston. A specific characteristic of this system which differs somewhat from the others given is that, through valve 141, the total of the leakage areas, between forward and back pressure lines, is made a constant value on all machines. Setting the valve under idling conditions, the leakage value is increased through proper opening of valve 141 to a value equal to, or slightly greater than the highest value, when idling, ever encountered on any machine of the type for which it is designed and to which the system may be applied. The variator $S^{12}$, shown as movable in response to changes in forward pressure, permits a variable escapement of fluid from the back pressure line 140 to the reservoir.

The resistance element 138, providing an injection of fluid into the back line, is so chosen or adjusted that, under the condition of maximum negative work resistance—when the back pressure is a maximum and the forward pressure a minimum—the summation of the leakages will be zero. In other words, the natural leakages out, added to the artificial leakage out through valve 141 will equal and balance the leakages in through the element 138. The valve $S^{12}$ will, at this point, be substantially closed. In a system thus arranged and adjusted the resultant effective leakage (summation) will have a definite, fixed value for any specific work resistance and temperature on any machine of the same type, regardless of the natural leakage characteristic of the particular machine.

The variation in leakage, produced by variations in working resistance and corresponding variations in pressure in the forward and back pressure lines is compensated for by variations in the opening of the valve member 142 of the variator $S^{12}$. As heretofore noted, in the case of the back pressure, the pressure will vary inversely as the work resistance; whereas, the forward pressure, on account of the action of the differential valve 148, will vary directly as the work resistance. Either the forward or the back pressure may, therefore, be utilized as a means for varying the opening of the compensating variator $S^{12}$ in accordance with the work resistance. In the system of Fig. 12 the forward pressure has been chosen for this purpose. A branch line 143 conducts fluid from the forward line to act on the piston 144 in opposition to the spring 145.

Assuming the valve 142 to be set at zero opening under conditions of maximum negative work resistance—when the forward pressure is a minimum—as the forward pressure increases the valve opening gradually increases and becomes a maximum under conditions of maximum positive work resistance. The area of valve flow opening for a given variation in pressure is, of course, a function of the valve contour or slope, and of the spring resilience. The desired values of these properties may be computed or determined by experiment. The screw 146 provides a means of adjustment in each machine.

Fig. 12 indicates the valve portion 147 as having a straight slope which may be sufficiently accurate as a practical matter in many instances. However, it is to be noted that a variation of fluid by-passed is produced, not only by a variation in position of the valve, but also that the pressure difference across the valve varies, and the discharge must be expressed algebraically in terms of the second order as previously pointed out, which graphically results in a parabola—the necessary contour of the effective end 147 of the valve for extreme accuracy. It will be seen that the last described system has an advantage with respect to the variator valve in that the contour of the element 147 thereof may be made continuous as distinguished e. g. from the double valve of Fig. 11.

The specific systems disclosed herein illustrate the principles of this invention and enable one, it is believed, by the application of such principles to compensate for the leakages occurring in other specific types. This may, in certain instances, require the combination of two or more of the elementary circuits and means dealt with herein. Such, in fact, is the case with respect to the circuits of Figs. 11 and 12 herein. In making such combinations, a convenient method e. g. of determining the required contour for the variator valve, where the systems become more complex as in Fig. 12, is to determine the contour for one type of circuit or fluid compensation, and then that of the other circuit and combine the two contours into one continuous slope.

It may be of interest to illustrate the operation of the above system by examples of the relative leakages and pressures which experimental data, computation, and plotted curves indicate to be typical of a circuit of a specific type of hydraulic power system coming within the principles outlined in the foregoing description. It is to be understood that the values related are intended to be representative only and may actually approach those given only in very special cases. In a system similar to that of Fig. 12 applied to certain sized milling machines, data selected shows that the pressure on the forward side of the piston may range from 880 lbs. per square inch to 100 lbs. per square inch as the work resistance varies from a maximum positive to a maximum negative under conditions, in the latter extreme, of a cutting force acting in the direction of movement. Simultaneously the back pressure may vary in inverse proportion from 140 lbs. per square inch to 400 lbs. per square inch. The rate of change of forward pressure with respect to change of back pressure is, of course, determined primarily by the ratio of the effective piston areas 148ª and 148ᵇ of the differential valve 148. In this case this ratio is assumed to be 3 to 1. At some point the opposed pressures in this type of system will be equal, which in the present case will be in the neighborhood of 325 lbs.

The various leakages are each approximately proportional to the pressure differences on opposite sides of the respective leakage area, and with the determination of their value at selected points, may be graphically represented on a chart, having the respective pressures noted above as ordinates along one axis.

A chart thus prepared affords a means of determining the respective leakage values at any value of piston pressure (work resistance); and as an example a chart exemplifying the conditions of a system corresponding to that of Fig. 12 and having the piston pressures noted above shows the following: At idling condition the forward pressure is 400 lbs. and the back pressure is 300 lbs. producing a differential pressure of 100 lbs. If the relief valve R has been set to produce a constant pressure of 880 lbs. per square inch in the line 136, then the pressure difference across the coil 138 will be 580 lbs. per square inch. The leakage then into the back line across the piston and including the opening through valve 141, as part of the fixed natural leakage areas, is shown to be 5 cubic inches per minute. To this is added a leakage of 28 cubic inches through the coil 138 making a total leakage of 33 cubic inches into the back line.

Considering the leakages out of the back pressure line there is, it appears, a natural leakage through various regions, including the selector valve L of 6 cubic inches per minute. The valve $S^{12}$ providing a balance in proportion to variations in pressure produces, at this point, a leakage out of the back line of 27 cubic inches per minute. The sum of the out-leakages is, therefore, 33 cubic inches per minute, which balances the in-leakages.

Taking an extreme point, in the direction of maximum positive work resistance, where the forward pressure is increased to 880 lbs. and the back pressure is decreased to 140 lbs. the differential pressure across the piston will then be increased to 740 lbs.; and the leakage into the back line across the piston, and through the valve 141 and any other susceptible areas has increased proportionately from 5 to 37 cubic inches. The leakage through the coil 138 has similarly increased, in direct proportion to the change in pressure difference across it, from 28 to 36 cubic inches, producing a total leakage into the back line of 73 cubic inches per minute. From the curve of leakage values through valve $S^{12}$ it appears that this has increased proportionately to the increase on piston 144 from 27 cubic inches to a value of 70 cubic inches; and the natural leakage out of the back line to the reservoir, etc., has decreased with the decrease in back pressure to 3 cubic inches. The total out-leakage, is 73 cubic inches balancing the in-leakage.

If values are examined at the other extreme maximum negative cut—it appears that the piston pressures are 400 lbs. back pressure and 100 lbs. forward pressure, the back pressure now being the higher. The curve for leakages across the piston including the valve 141 is now 15 cubic inches; but since the back pressure is now the higher, this leakage is out of the back line, and into the forward line, the curve for this leakage having crossed the base or zero line for leakages. The natural leakage out to the reservoir has increased to 8 cubic inches. The total out-leakage at this point then is 23 cubic inches. Checking our curve for the flow through the resistance 138, it appears that this value has fallen to 23 cubic inches in-leakage balancing the out-leakage. It will be recalled from the description of Fig. 12 that the valve $S^{12}$ at this point was adjusted to the zero value, just at the point of opening.

Another critical and interesting point to be noted on a prepared chart of this nature, is that where the pressures in the back and forward lines are equal. On the relations noted above it can be determined by computation or inspection of the chart that this point occurs at the piston pressure of 325 lbs. The leakages then will be artificial out-leakages through valve $S^{12}$ and natural out-leakages through the main valves, etc., to the reservoir; and in-leakages through the resistance element 138. No leakage, of course, occurs across the piston or valve 141.

The natural leakage points in any particular type of circuit may consist of various joints, distributing valves, pistons, etc., which form the physical or mechanical components thereof, and in referring throughout the foregoing to natural in, or out-leakages, it is intended that these are merely illustrative of the many possible sources and not limited simply to the piston or specific element mentioned. The particular points of natural leakage are, it will be understood, the various components which in their sum total constitute the machine factor, and once having been experimentally determined upon, can be initially compensated for under a specific condition, and since they thereafter all simultaneously vary in direct or inverse proportion to variation in pressure this same variation can be utilized to regulate a further variable artificial leakage to maintain a balanced system under all conditions.

It may be noted, and it is here desired to particularly emphasize, that the term work resistance, as employed throughout the specification and claims, is intended to mean the resultant of the mechanical forces tending to either urge or restrain the movement of the translatable element; and may be, as has been explained, either positive or negative in its effect. The work resistance is e. g. negative when it tends to assist in the normal movement; and positive when it tends to restrain such movement. If neither condition is present then the work resistance becomes zero in value. Algebraically then the term "work resistance" may be zero, a negative quantity, or a positive quantity.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

We claim:—

1. A hydraulic system combining a motor; a source of hydraulic fluid supply for said motor; a hydraulic rate control line subject to natural leakage connected with said motor governing the rate of movement thereof; and means providing an artificial leakage to balance the natural leakages of said rate control line.

2. A hydraulic propulsion means combining a hydraulic motor; a fluid rate control line therefor, said line being subject to natural leakage;

a fluid regulating device in said line; and means providing an enforced artificial leakage of hydraulic fluid with respect to said line to compensate for the natural leakage of said line.

3. An hydraulic motor; an hydraulic rate control line governing the speed of operation of said motor, said control line being subject to natural leakage normally tending to alter the speed of said motor; and means connected with said control line to provide an artificial leakage tending to retard or advance the speed of said motor, conversely as the resultant natural leakage of said line tends to advance or retard respectively the speed of said motor.

4. A hydraulic power motor for machine tools; a rate control line including means therein for regulating the discharge from said motor to thereby regulate its speed, said line being subject to natural leakage of fluid thereinto in excess of any natural out-leakages and means for artificially extracting hydraulic fluid from said line to compensate for the resultant natural leakages into said rate control line and thereby maintain a balancing of the leakages.

5. A hydraulic power motor for machine tools; a rate control line including means therein for regulating the discharge from said motor to thereby regulate its speed, said line being subject to natural out-leakages in excess of any natural in-leakages; and means for artificially injecting hydraulic fluid into said line to compensate for the resultant natural out-leakages of said line to thereby maintain a balancing of the leakages.

6. A hydraulic propulsion system for machine tools combining an hydraulic motor; a hydraulic rate control line connected thereto; means in said line for regulating the flow of liquid therein and thereby the speed of said motor; said line being subject to natural leakages which result in variation of the speed of said motor; and means connected to said control line providing an artificial leakage to balance the resultant natural leakage thereof.

7. An hydraulic propulsion system combining an hydraulic motor; a hydraulic rate control line connected thereto; means in said line for regulating the flow of liquid therein and thereby the speed of said motor, said line being subject to natural leakages which result in variation of the speed of said motor; means connected to said control line providing an artificial leakage opposed to the resultant of said natural leakages to compensate therefor; and means for automatically varying said artificial leakage as said resultant leakage varies under changes of pressures resulting from variations of the work resistance thereby to maintain a balanced leakage under all normal conditions of operation.

8. An hydraulic propulsion system for machine tools combining an hydraulic motor; an hydraulic fluid line for the discharge from said motor; means in said line for regulating said discharge and thereby the speed of said motor, said line being subject to natural leakages which result in variation of the speed of said motor; and means connected to said discharge line providing an artificial leakage to balance the resultant natural leakage thereof.

9. An hydraulic propulsion system for machine tools combining an hydraulic motor; an hydraulic fluid line for the discharge from said motor; means in said line for regulating said discharge and thereby determining the speed of said motor, said line being subject to natural leakages which affect the speed of said motor; means connected to said discharge line providing an artificial leakage to compensate for the resultant natural leakage; and means for automatically varying said artificial leakage as said resultant natural leakage varies with variations in work resistance and corresponding variations in pressure in said system, whereby a balanced leakage is maintained for all values of work resistance.

10. An hydraulic propulsion motor for machine tools; a hydraulic fluid rate control line therefor including means therein for regulating the supply to said motor and thereby the speed of said motor, said line being subject to natural leakages which result in variation of the speed of said motor; and means connected to said control line providing an artificial leakage to balance the resultant natural leakage thereof.

11. An hydraulic propulsion system for machine tools combining an hydraulic motor; an hydraulic fluid supply line therefor including means therein for regulating the supply to said motor and thereby the speed of the latter, said line being subject to natural leakages which result in variation of the speed of said motor; means connected to said supply line providing an artificial leakage opposed to the resultant natural leakage to compensate therefor; and means for automatically varying said artificial leakage as said resultant natural leakage varies to maintain a balanced leakage for all variations of work resistance and thereby of natural leakages.

12. An hydraulic propulsion system for machine tools combining an hydraulic motor; an hydraulic fluid supply line therefor; means in said line for regulating the supply to said motor and thereby the speed of the latter, said line being subject to natural leakages of which the total out-leakages are in excess of all in-leakages whereby a retarding effect is produced on the speed of the motor; and means connected to said supply line for artificially injecting fluid to compensate for the resultant natural out-leakages.

13. An hydraulic power system combining an hydraulic motor; a fluid line connected thereto; a regulating device in said line; said line being subject to natural leakages thereby affecting the rate of operation of said motor; initial artificial leakage means connected to said line for providing an artificial leakage of hydraulic fluid to compensate for the resultant of the natural leakages under a selected work resistance with corresponding pressures in said system; a variable artificial leakage compensating means connected to said line; and means for controlling said variable leakage connected to a point in said system subject to variations of pressure in accordance with variations of said work resistance, said variable leakage being adapted thereby to compensate for the variations in natural leakage and said initial leakage means resulting from variations in pressure in said system as the work resistance varies from said selected value.

14. An hydraulic power system, said system being subject under varying work resistances to variations in pressures and to corresponding variations in natural leakages; means providing an artificial leakage operative under a selected work resistance to balance the resultant of the natural leakages; and means for automatically varying said artificial leakage to maintain a balance of leakages as the pressures in said system vary under variations in work resistance.

15. An hydraulic power system combining an hydraulic motor, said system being subject, under varying work resistance, to variations in pressure and corresponding variations in natural leakages affecting the rate of operation of said motor; means connected in said system for providing an artificial leakage compensating for the resultant of said natural leakages when said motor is operating under idling conditions; and means for automatically varying said artificial leakage to maintain a balanced leakage as said natural leakages vary under varying pressures resulting from variations in said work resistance.

16. An hydraulic system combining an hydraulic motor; hydraulic fluid connections thereto including an hydraulic fluid rate control line; a regulating device in said control line, said system being subject to variations in pressure with corresponding variations in natural leakages affecting said control line and thereby the rate of operation of said motor; means connected with said control line providing a compensating leakage to balance the resultant of said natural leakages when said motor is operating under idling conditions; and means for automatically varying said compensating leakage as said natural leakages vary under changes in pressures resulting from changes in work resistance to thereby maintain a balance between the leakages for all conditions of operation.

17. An hydraulic system combining an hydraulic motor; hydraulic fluid connections thereto including an hydraulic rate control line; a regulating device in said control line, said system being subject to variations in pressure with corresponding variations in natural leakages affecting said control line and thereby the rate of operation of said motor; means connected with said control line providing a compensating leakage to balance the resultant of said natural leakages when said motor is operating under idling conditions; a pressure responsive device, connected in said hydraulic system at a point which varies in pressure with variations in work resistance, for controlling said compensating leakage means to maintain a balance of leakages in said control line for all variations in pressures resulting from variations in work resistance.

18. An hydraulic power system combining an hydraulic motor subject to variations of forces impressed thereon in its operation; an hydraulic fluid rate control line for said motor including a regulating device therein, said line being subject to variable natural leakages as the pressures in said system vary with the variation of forces on said motor; means connected to control line providing a compensating leakage to balance the resultant of the natural leakages at a selected condition of operation with corresponding pressure variations in the system; and means for varying the compensating leakage as the natural leakage varies under varying pressures in the system resulting from variations in the forces on said motor, to thereby maintain the leakages balanced under all conditions.

19. A device for counteracting the effects of leakage across the piston of a piston and cylinder mechanism combining, a valve mechanism having an adjustable valve element therein for controlling a flow of fluid therethrough; fluid connections between said valve mechanism and the fluid in said cylinder and between said valve mechanism and another source of fluid; and means responsive to variations in the pressure of the fluid in said last named fluid connection to adjust the position of said valve element thereby to regulate the flow of compensating fluid through said valve.

20. A mechanism for compensating for the effects of leakage in an hydraulic motor subjected to variable loads and in which the natural leakage of fluid therein produces variations in the rate of movement of the motor combining, a valve means, communicating with a source of fluid pressure and said motor for providing a flow of compensating fluid to balance the natural leakages; and means responsive to variations in the pressure in said motor for varying the effectiveness of said valve means.

21. An hydraulic system combining a forward pressure line and a back pressure line; an hydraulic motor of the piston and cylinder type connected with said lines and in which there is a natural leakage of fluid from one side of said piston to the other side tending to vary the rate of movement of the motor; and means including an escapement device for providing for an artificial balancing leakage of a magnitude substantially equal to the natural leakage but opposite in its effect upon the rate of movement of said motor.

22. An hydraulic system combining a leaky motor of the piston and cylinder type; conduits connected with said motor for conveying fluid thereto and therefrom; means for varying the rate of flow through one of said conduits thereby to vary the rate of movement of said motor; leakage compensating means for said motor; and means automatically responsive to variations in the fluid pressure in the conduit adapted to convey fluid from the said motor for controlling the effectiveness of said leakage compensating means.

23. An hydraulic system combining a motor normally subject to natural leakages of the hydraulic fluid affecting its rate of operation; fluid conduits connected with said motor; mechanism for controlling the flow of fluid through one of said conduits thereby to vary the rate of movement of said motor; means for counteracting the effects of natural motor leakages on the rate of movement thereof; and means automatically responsive to variations in one of the factors causing motor leakage to vary the action of said counteracting means.

24. A mechanism for compensating for leakages normally occurring in an hydraulic motor thereby to maintain a predetermined rate of movement thereof irrespective of variations in pressure values in the motor combining, a variable orifice valve means in liquid communication with the fluid in said motor and adapted to control a flow of compensating fluid therethrough to balance the effect of the normal leakages; and means for varying the effectiveness of said valve means in accordance with said variations in pressure values to maintain said balance under varying physical conditions.

25. A device for compensating for leakages normally occurring in an hydraulic motor, combining a valve mechanism for causing an artificial leakage to occur to balance the effect of the normal leakage; and means responsive to variations in the fluid pressure acting on one side of the piston of said motor to vary the action of said valve mechanism.

26. An hydraulic propulsion system for machine tools combining an hydraulic motor; an hydraulic fluid supply line therefor; an hydraulic fluid discharge line for said motor; means in one of said lines for regulating the flow of fluid therein and thereby the speed of said motor; said system being subject to in and out natural leakages which result in variations in speed of said motor; and means connected to one of said lines providing an artificial leakage opposed to the resultant natural leakage to compensate therefor, said artificial leakage being subtractive when the natural in-leakages exceed the natural out-leakages and additive when the natural out-leakages exceed the natural in-leakages; and means automatically varying said artificial leakage as said resultant natural leakage varies to maintain a balanced leakage under all conditions of pressure and natural leakage.

HANS ERNST.
BERNARD SASSEN.